(12) United States Patent
Freeman et al.

(10) Patent No.: US 6,847,716 B2
(45) Date of Patent: Jan. 25, 2005

(54) QUICK SHIFT JACK PANEL

(75) Inventors: Edmund C. Freeman, Niantec, CT (US); Dickie K. Murchison, Danbury, CT (US)

(73) Assignee: The Southern New England Telephone Company, New Haven, CT (US)

( * ) Notice: Subject to any disclaimer, the term of this patent is extended or adjusted under 35 U.S.C. 154(b) by 559 days.

(21) Appl. No.: 09/945,057

(22) Filed: Aug. 31, 2001

(65) Prior Publication Data

US 2003/0043993 A1 Mar. 6, 2003

(51) Int. Cl.[7] .............................................. H04M 5/00
(52) U.S. Cl. ........................................ 379/326; 379/325
(58) Field of Search ................................ 379/325, 326, 379/327, 328, 329

(56) References Cited

U.S. PATENT DOCUMENTS

| | | | | |
|---|---|---|---|---|
| 3,842,219 A | * | 10/1974 | Anderson | 379/325 |
| 4,122,313 A | * | 10/1978 | De Luca | 379/327 |
| 4,127,748 A | * | 11/1978 | Gillemot | 379/327 |
| 4,639,555 A | * | 1/1987 | Bone | 379/327 |
| 4,675,895 A | * | 6/1987 | Neail et al. | 379/16 |
| 4,712,232 A | * | 12/1987 | Rodgers | 379/329 |
| 5,034,846 A | * | 7/1991 | Hodge et al. | 361/119 |

* cited by examiner

Primary Examiner—Bing Q. Bui

(57) ABSTRACT

A cable pair shifting system (12) for shifting a cable pair (20) from an old cable pair location to a new cable pair location includes a quick shift jack panel (64). The quick shift jack panel (64) contains an old pair of connection locations and a new pair of connection locations. A first test cord (70) has a first old end for coupling to the old pair of connections and a second old end for coupling to the old cable pair location. A second test cord (76) has a first new end for coupling to the new pair of connections and a second new end for coupling to the new cable pair location. The quick shift jack panel (64) in combination with the first test cord (70) and the second test cord (76), shift the cable pair from the old cable pair location to the new cable pair location.

22 Claims, 6 Drawing Sheets

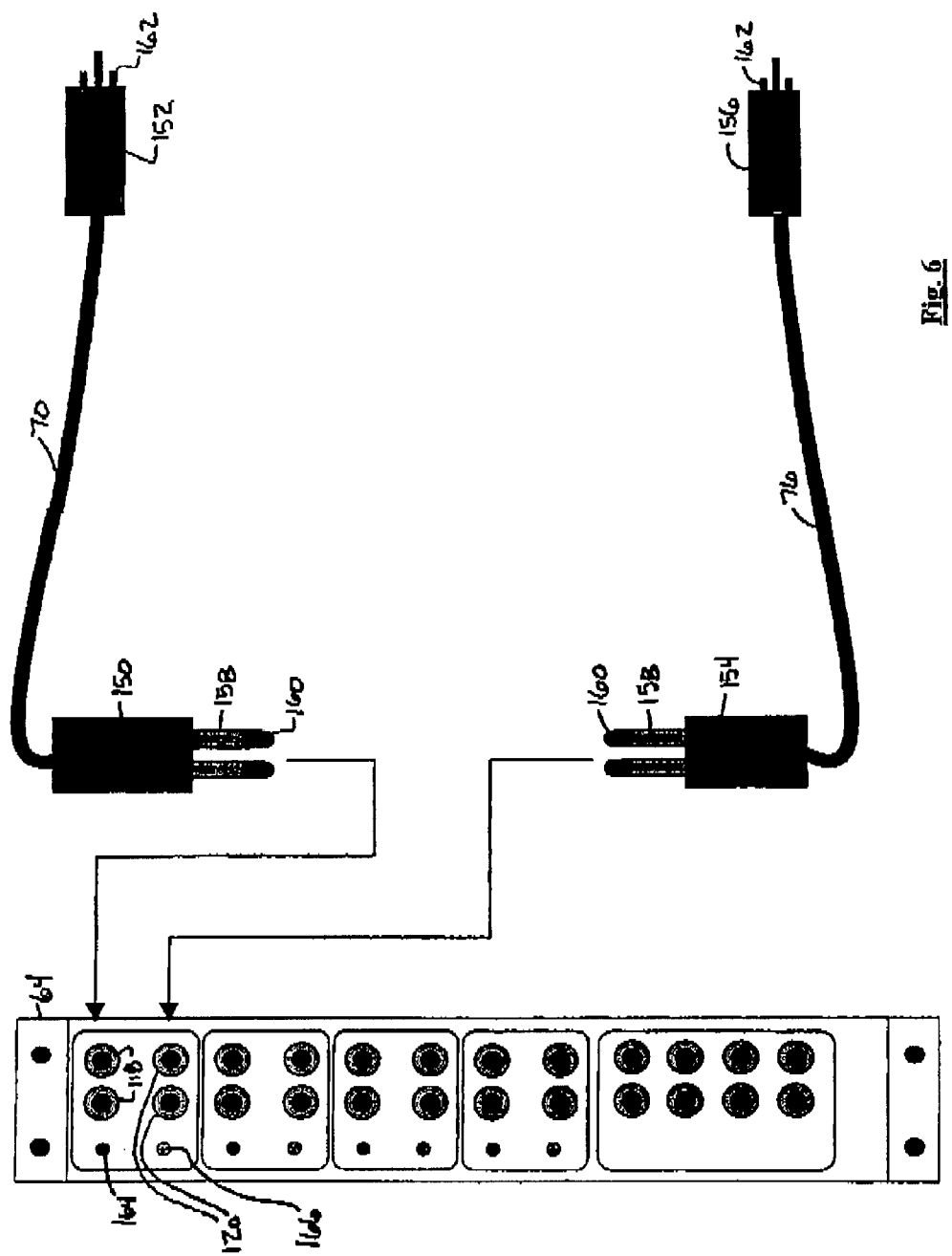

US 6,847,716 B2

QUICK SHIFT JACK PANEL

TECHNICAL FIELD

The present invention relates generally to telephone circuits, and more particularly to a method and apparatus for shifting a cable pair on a main distribution frame.

BACKGROUND OF THE INVENTION

In order to redirect communication signals and/or services from a first terminal to a second terminal within a telephone circuit, a cable pair shift is required. Typically, using existing techniques, in order to perform a cable pair shift, a pair of wires that terminate on one cable pair location are disconnected at that location and reconnected at a new location. Both the old cable pair location and the new cable pair location are located within a main distribution frame (MDF). Often, the shift of a cable pair includes hard wiring a new jumper from a central office equipment location on a horizontal side of the MDF to a new protector head location on a vertical side of the MDF. In so doing, a technician shifts service equipment for a customer from the original cable pair to the new cable pair. Frequently, the technician must wait for access to the MDF in order to perform the cable pair shift and verify that the circuit is operating properly.

The cable pair shift is typically performed by an internal service provider technician and an external technician. The internal service provider technician has access to both the horizontal side and the vertical side of the MDF, and the external technician has access only to the vertical side of the MDF. In any event, frequently the external technicians do not have access to special tools, which are required to perform the transfer. Some of the special tools include: wire wrap guns, pushdown tools, and soldering irons among others. Often, such tools are stored in a locked location where access is difficult. Also, contractual obligations may prohibit the external technician from performing any work on the horizontal side of the MDF. As is evident, considerable time can be wasted in performing the cable pair shift. As a result, customer service is delayed, and customer satisfaction is effected.

Therefore, it would be desirable to provide an improved method and apparatus for shifting a cable pair to decrease downtime and costs involved in shifting a cable pair and increase customer satisfaction.

BRIEF DESCRIPTION OF THE DRAWING

For a more complete understanding of this invention reference should now be had to the embodiments illustrated in greater detail in the accompanying figures and described below by way of examples of the invention wherein:

FIG. 6 is an example of a connecting diagram of the quick shift jack panel of FIG. 3A and two test cords according to an embodiment of the present invention;

DETAILED DESCRIPTION OF THE PREFERRED EMBODIMENT

In the following description the terms "OLD" and "NEW" are used to describe an original location or connection and an updated location or connection, respectively. They may also be used to refer to a component that is connected to an original or updated location or connection. The terms "OLD" and "NEW" do not in anyway describe the age of a connection or component. The following description is of a method and apparatus for shifting of a cable pair on a main distribution frame. A cable pair shifting system for shifting a cable pair from an "old" cable pair location to a "new" cable pair location and a method for doing the same are provided including a quick shift jack panel (jack panel). The jack panel includes an "old" pair of connections electrically coupled to a "new" pair of connections. A first test cord has a first "old" end for electrically coupling to the "old" pair of connections and a second "old" end for electrically coupling to the "old" cable pair location. A second test cord has a first "new" end for electrically coupling to the "new" pair of connections and a second "new" end for electrically coupling to the "new" cable pair location. The quick shift jack panel in combination with the first test cord and the second test cord, shift the cable pair from the "old" cable pair location to the "new" cable pair location.

While the present invention is described with respect to a method and apparatus for shifting of a cable pair on a main distribution frame, the present invention may be adapted to be used for various purposes and applications including: telephone networks, telephone circuits, communication systems, or other applications, which may require shifting of cable pairs.

In the following description, various operating parameters and components are described for one constructed embodiment. These specific parameters and components are included as examples and are not meant to be limiting.

Figure 1:
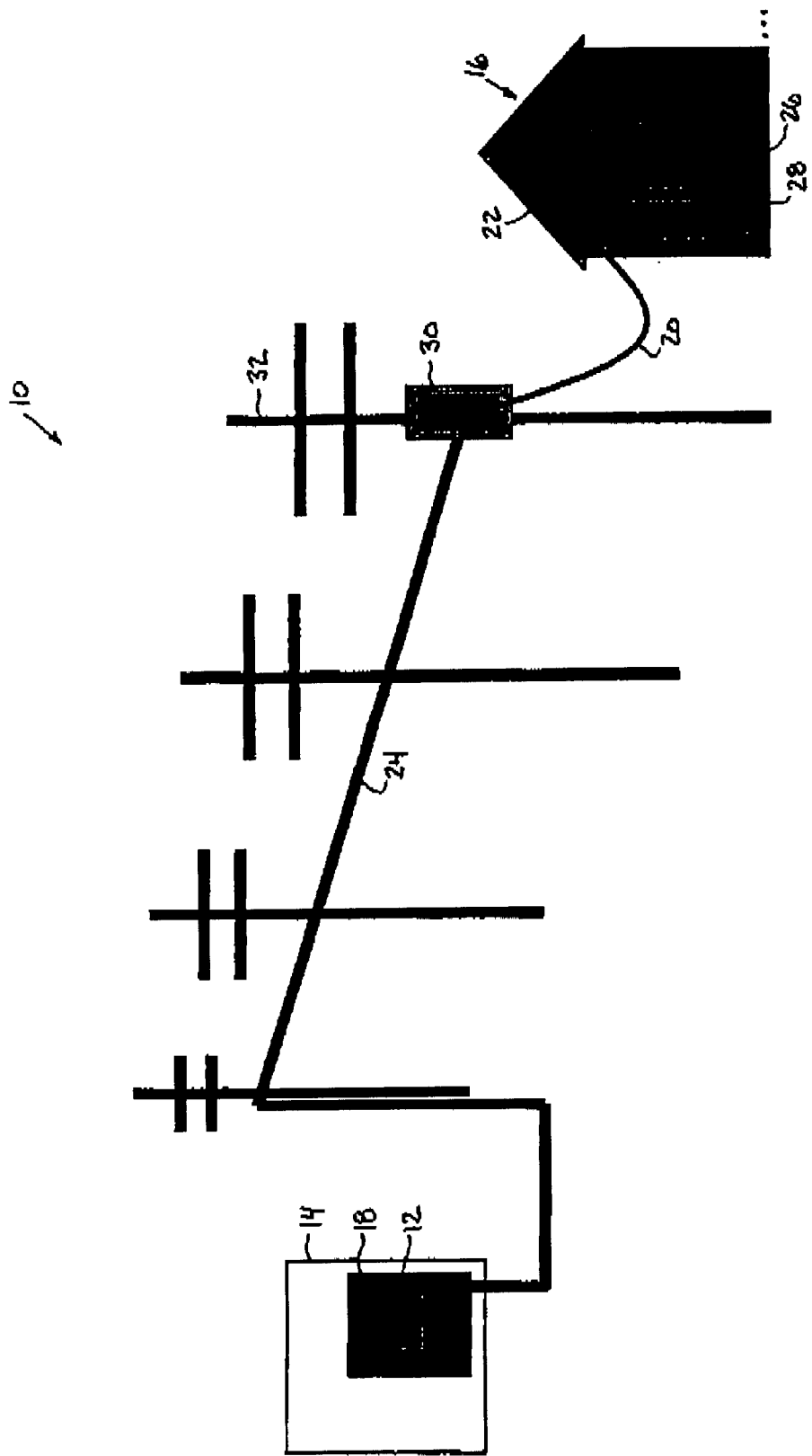
FIG. 1 is a schematic view of a telephone network wherein the cable pair shifting system in accordance with an embodiment of the present invention may be used to advantage.

Referring now to FIG. 1, a schematic view of a telephone network 10 implementing a cable pair shifting system 12 in accordance with an embodiment of the present invention is shown. A central office 14 receives and transmits communication signals to and from a customer premises 16 via a main distribution frame (MDF) 18. The customer premises 16 may be a residential or commercial customer, either of which may have specific and different service needs. A cable pair 20 enables the connection between a customer 22 and the MDF 18. Hundreds or thousands of cable pairs 24 may be connected to the MDF 18. Not only do cable pairs exist and correspond to current customers but also other additional cable pairs may exist as spares. The spare cable pairs may be used when new customers come online, existing customers change their existing services or phone numbers, or when used existing cable pairs are providing a deteriorated signal.

A cable pair 20 originates at a terminal 26, is passed through a station protector 28, and is connected to a servicing terminal 30. The servicing terminal 30 may be located on a telephone pole 32 as shown or at ground level service box for underground communication systems. From the servicing terminal 30 the cable pair 20 communicates with the central office 14 containing the MDF 18 by way of a corresponding cable pair. The quick shift system 12 is attached to the MDF 18 and is used within the MDF 18 as to allow for an easy and quick shifting of any of the cable pairs 24.

Figure 2:
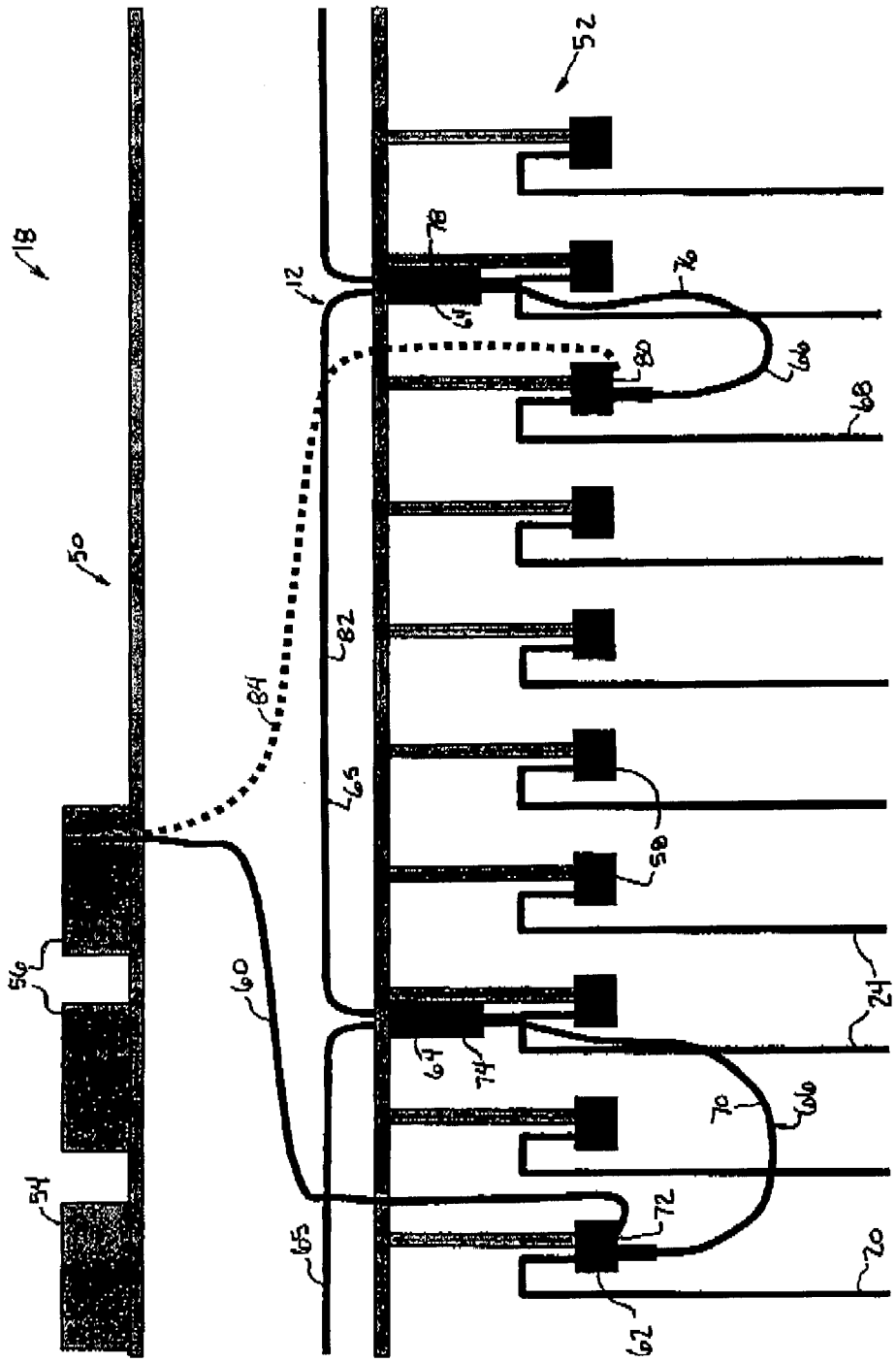
FIG. 2 is a schematic diagram of a main distribution frame having a cable pair shifting system in accordance with an embodiment of the present invention.

Referring now to FIG. 2, a schematic diagram of an MDF 18 having a system 12 in accordance with an embodiment of the present invention is shown. The MDF 18 has a horizontal side 50 and a vertical side 52.

The horizontal side 50 contains original equipment 54 and special services equipment 56. This equipment 54 and 56 is typically only accessible by an internal service provider technician. The original equipment 54 is used for establishing a dial tone on the customer's cable pair 20. The special services equipment 56 supplies various other services including: data services, Internet service, T1 lines, DSL lines, and various other communication services.

The vertical side 52 contains the cable pairs 24, protector head(s) 58, and the system 12. The cable pairs 24 are attached to a protector head 58.

The protector heads 58 may be of various type including: C-type, Porta-type, 300-type, 303-type, or other various types known in the art. Each protector head 58 may have hundreds of cable pair connections. Protector heads 58 provide fuse-like protectors for each respective cable pair.

Typically when a service is provided to a customer, a jumper 60 is hard-wired from a protector head containing the respective customer's cable pair to a switch (not shown) contained within the originating equipment 54 or the special services equipment 56. An internal service provider technician connects one end of the jumper 60 to the originating equipment 54 or the special services equipment 56, and an external technician connects the other end of the jumper to a location on a protector head 62 corresponding to that customer.

System 12 of the present invention allows the external technician to provide the service to the customer quickly and easily, without having to hard-wire a jumper, until a hard-wire connection is made. The system 12 includes one or more jack panels 64 that are electrically connected together by connecting cables 65 and at least two test cords 66.

The following example illustrates how the system 12 is arranged and connected on the MDF 18. When a customer is changed from one cable pair 20 to another cable pair 68, as shown, a first test cord 70 is plugged into an "old" protector head 72 and a first jack panel 74. A second test cord 76 is plugged into a second jack panel 78 and a "new" protector head 80. The service to the customer is provided through the existing jumper 60, the first test cord 70, the first jack panel 74, a connecting cable 82, the second jack panel 78, and the second test cord 76. This arrangement remains in place until a technician service is dispatched to hard-wire a "new" jumper (shown as hidden line 84) directly from the service equipment 56 to the "new" protector head 80.

Figure 5:
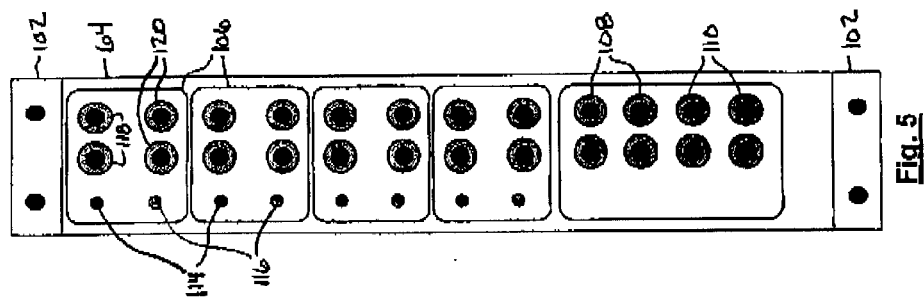
FIG. 5 is a front view of the quick shift jack panel of FIG. 3.
Figure 4:
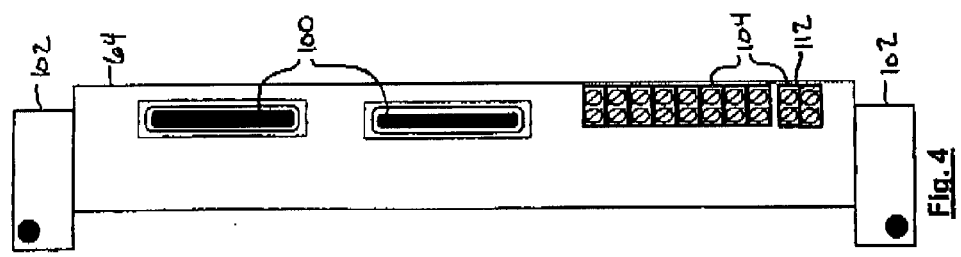
FIG. 4 is a rear view of the quick shift jack panel of FIG. 3.
Figure 3:
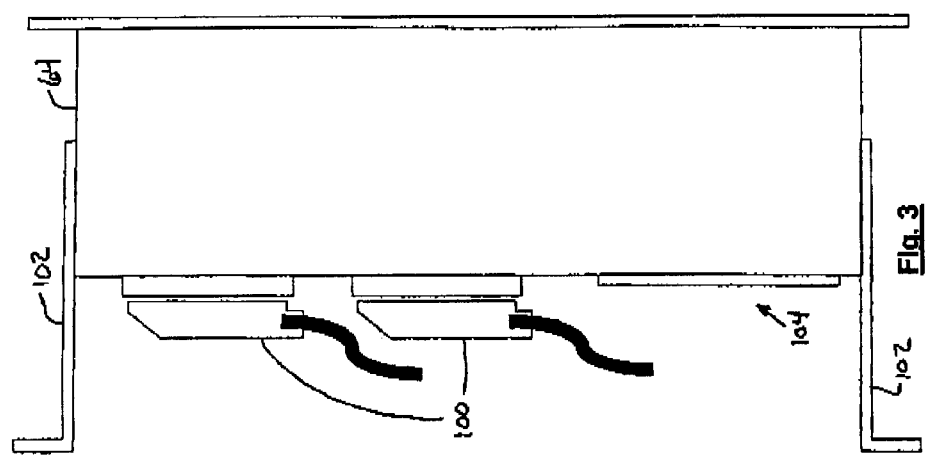
FIG. 3 is a side view of a quick shift jack panel in accordance with an embodiment of the present invention.

Referring now to FIGS. 3, 4, and 5 a side view, a rear view, and a front view of the jack panel(s) 64 in accordance with an embodiment of the present invention are shown, respectively. The panel includes "IN" and "OUT" receptacles 100 for the connecting cables 65, which are used to wire the panels in parallel. Although, the jack panel 64 as shown has various mounting brackets 102 for attaching the jack panels 64 to the vertical side 52, other attachment mechanisms known in the art may be used. The jack panel 64 has multiple external connections 104, which correspond with oscillator ports 108 and auxiliary ports 110. The external connections 104 also include power connections 112 for supplying power to "OLD" lamps 114 and "NEW" lamps 116, as best shown in FIG. 5.

Although, the jack panel 64 is shown as having four shift shoes 106, it may contain any number of shift shoes. The shift shoes 106 are used for creating a temporary jump between an "old" cable pair and a "new" cable pair. Each shift shoe 106 contains a pair of "OLD" connections 118 and a pair of "NEW" connections 120. The connections 118 and 120 may be ports as shown or other connector styles known in the art.

The oscillator ports 108 are used to determine continuity and suitability of cable pairs. Certain services require a certain gauge wire or length of wire. The oscillator ports 108 aid in determining whether an existing cable pair is suitable for such a service. The oscillator port 108 may be a low tone sequencing oscillator connection or a high tone sequencing oscillator connection for determining suitability for different services. The auxiliary ports 108 are available as spare ports, which may be used as oscillator ports or for other related purposes.

All connections of the present invention may be of various styles including: contacts, ports, connectors, jacks, receptacles, or other styles known in the art.

Referring now to FIG. 6, an example of a connecting diagram of the jack panel 64 and the test cords 70 and 76 of an embodiment of the present invention is shown. A single jack panel 64 in combination with the first test cord 70 and the second test cord 76 may be used to shift a customer from a first cable pair to a second cable pair.

A first "old" end 150 of the first test cord 70 is plugged into the "old" pair of connections 118, and the second "old" end 152 is plugged into an "old" cable pair location on the "old" protector head 72. A first "new" end 154 of the second test cord 76 is plugged into the first "new" pair of connections 120, and a second "new" end 156 is plugged into a "new" cable pair location on either the "old" protector head or a "new" protector head. Although, the first "old" end 150 and the first "new" end 154 are shown as having long sleeves 158 and tips 160, and the second "old" end 152 and the second "new" end 156 are shown as having pins 162, other connector ends known in the art may be used. The other connector ends may be of various size, shape, and style, as long as they have corresponding connections in their respective jack panels. The long sleeves 158 when plugged into the first "old" pair of connections 118 and the first "new" pair of connections 120 provide a connection between two contacts so as to illuminate an "OLD" lamp 164 and a "NEW" lamp 166. The "old" lamp 164 and the "new" lamp 166 allow a technician to determine when the first "old" end 150 and the first "new" end 154 are plugged into the first "old" pair of connections 118 and the first "new" pair of connections 120.

Plugging the test cords 70 and 76 into respective ports 118 and 120 is one example of an attachment, depending on the test cords and connections. Other methods of attaching the test cords to the connections may be used, which will be apparent to one of skill in the art. These may include plugging, press fitting, snapping, wrapping, twisting, or clipping a test cord end to a port, receptacle, or other receiving style connector.

Figure 7:
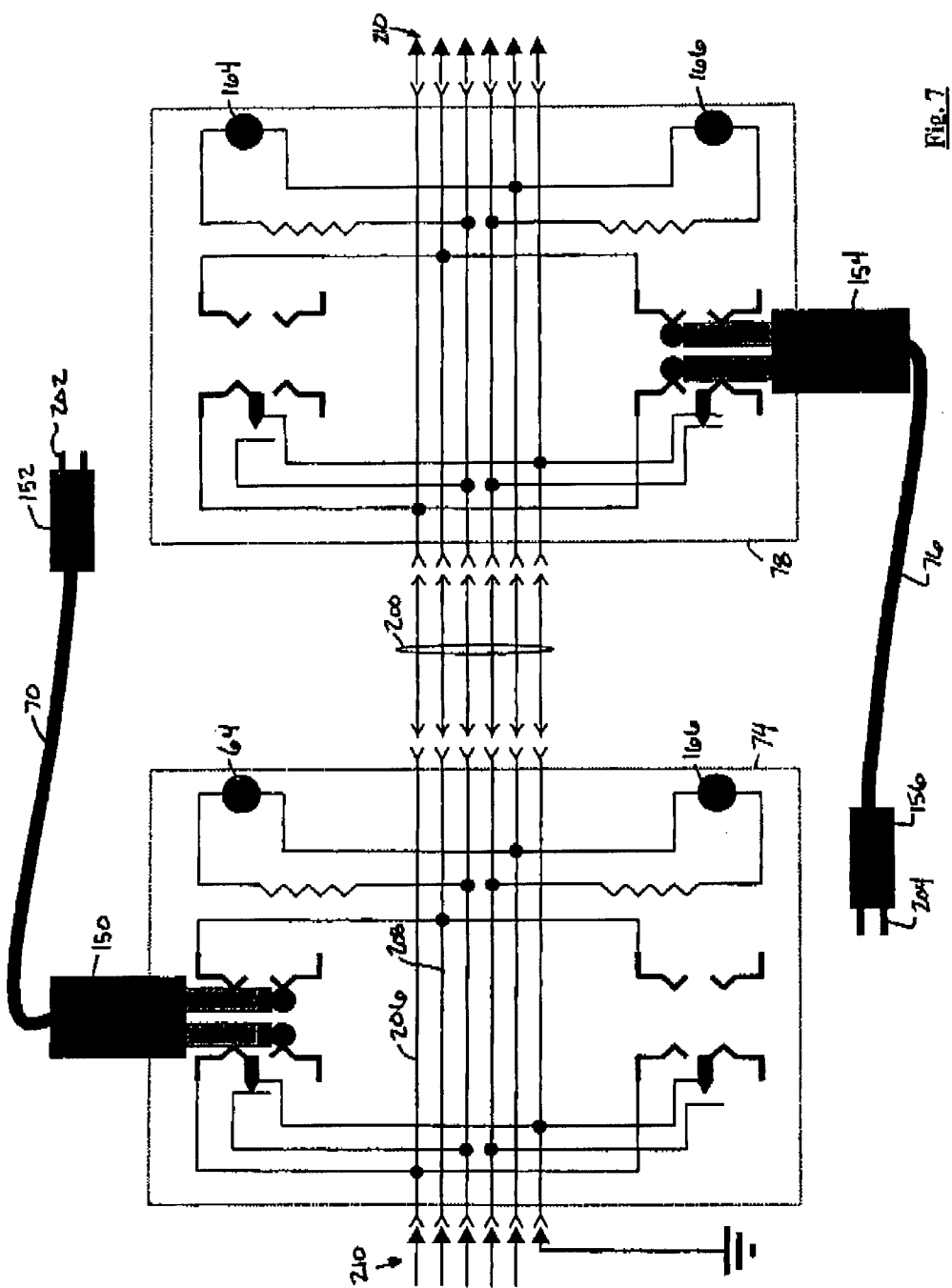
FIG. 7 is a schematic wiring diagram of a quick shift jack panel in accordance with an embodiment of the present invention.

Referring now to FIG. 7, a wiring diagram of a quick shift jack panel in accordance with an embodiment of the present invention is shown. The first jack panel 74 is wired in parallel to the second jack panel 78, by the connecting cable 82 represented by ring 200. The first "old" end 150 is plugged into the first "old" pair of connections 118 and the second "new" end 154 is plugged into a second "new" pair of connections 120, as described above. A standard connector configuration used in industry for the second "old" end 152 and the second "new" end 156 is shown. The second "old" end 152 has short-pins 202 and the second "new" end 156 has long pins 204. Short pins 202 on the second "old" end 152 are cross-wired through the test cords 70 and 76 and jack panels 74 and 78 to the long pins 204 on the second "new" end 156. The cross-wire connection through the jack panels 74 and 78 from the first "old" pair of connections 118 to the first "new" pair of connections 120 is represented by tip wire 206 and ring wire 208.

Multiple jack panels may be daisy-chained together using the connecting cables 65. Other adjacent connecting cables that are attached to jack panels 74 and 78 are represented by arrows 210. When multiple jack panels are used, they may be mounted at regular or irregular intervals as needed within a MDF. By mounting multiple jack panels at various intervals, connections may be created between "old" locations and "new" locations without long jumpers or test cords.

Figure 8:
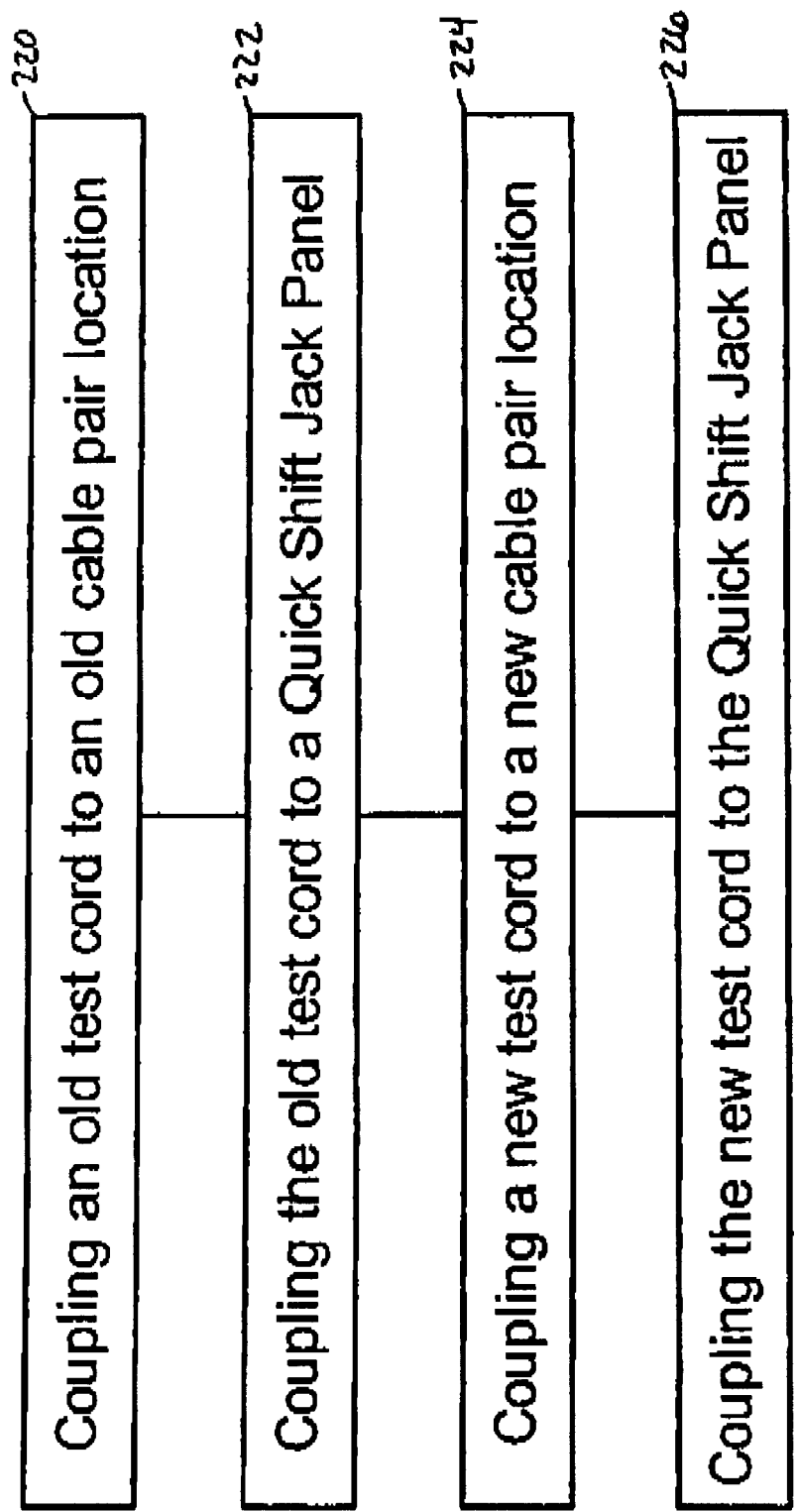
FIG. 8 is a logic flow diagram of one method of shifting a cable pair on a main distribution frame, according to an embodiment of the present invention.

Referring now to FIG. 8, a logic flow diagram illustrating one method of shifting a cable pair on a MDF having a cable pair shifting system, according to an embodiment of the present invention, is shown.

In step 220, a first end of an "old" test cord is connected to an "old" location. The "old" location being the location on an "old" protector head where an existing jumper is attached.

In step 222, a second end of the "old" test cord is connected to a pair of "old" connections on a first jack panel.

In step 224, a first end of a "new" test cord is connected to a "new" location on either the "old" protector head or a "new" protector head.

In step 226, a second end of a "new" test cord is connected to a pair of "new" connections on the first jack panel or a second jack panel. This method allows for quick and easy cable pair shifting without the need for tools.

The present invention provides an easy, time-efficient system and method for shifting a cable pair within a telephone network. The present invention allows for nearly immediate service updates without delays due to lack of access to portions of an MDF or authorization to perform a cable pair shift. The present invention also provides technicians with more time to hard-wire a "new" jumper by providing a temporary connection between an "old" location and a "new" location. The present invention also provides a device for shifting between cable pairs that are located many feet apart without use of long, cumbersome and expensive test cords.

The above-described apparatus, to one skilled in the art, is capable of being adapted for various purposes and is not limited to the following systems: telephone networks, telephone circuits, communication networks, or other applications that may require shifting of cable pairs. The above-described invention may also be varied without deviating from the spirit and scope of the invention as contemplated by the following claims.

What is claimed is:

1. A cable pair shifting system for shifting a cable pair from an old cable pair location to a new cable pair location, said system comprising:
   a first quick shift jack panel comprising;
      an old pair of connections; and
      a first new pair of connections electrically coupled to said old pair of connections;
   a first test cord comprising;
      a first old end electrically coupling to said old pair of connections; and
      a second old end electrically coupling to the old cable pair location; and
   a second test cord comprising;
      a first new end electrically coupling to said first new pair of connections; and
      a second new end electrically coupling to the new cable pair location;
   said first quick shift jack panel in combination with said first test cord and said second test cord shifting the cable pair from the old cable pair location to the new cable pair location.

2. A system as in claim 1 further comprising:
   a second quick shift jack panel electrically coupled to said first quick shift jack panel comprising;
      a second new pair of connections electrically coupled to said first new pair of connections;
   said first new end electrically coupling to said second new pair of connections;
   said first quick shift jack panel and said second quick shift jack panel in combination with said first test cord and said second test cord shifting the cable pair from the old cable pair location to the new cable pair location.

3. A system as in claim 1 further comprising a plurality of quick shift jack panels.

4. A system as in claim 3 wherein each quick shift jack panel of said plurality of quick shift jack panels each comprise a plurality of old pairs of connections and a plurality of new pairs of connections.

5. A system as in claim 3 wherein each of said plurality of quick shift jack panels are installed on a main distribution frame at regular intervals.

6. A system as in claim 1 wherein said old pair of connections and said new pair of connections are old shift shoe ports and new shift shoe ports, respectively.

7. A system as in claim 1 wherein said old pair of connections and said new pair of connections comprises at least one of electrical contacts, ports, connectors, and receptacles.

8. A system as in claim 1 further comprising an oscillator connection for determining continuity and suitability of cable pairs.

9. A system as in claim 8 wherein said oscillator connection is a low tone sequencing oscillator connection or a high tone sequencing oscillator connection.

10. A system as in claim 1 further comprising auxiliary connections for spare connections.

11. A system as in claim 1 further comprising external connections for electrically coupling said first quick shift jack panel to a second quick shift jack panel.

12. A system as in claim 11 wherein said external connections are tone connections.

13. A system as in claim 1 wherein said first quick shift jack panel further comprises a shift shoe indicator.

14. A system as in claim 13 wherein said shift shoe indicator comprises at least one of an old busy lamp, a new busy lamp, a lamp, and an LED.

15. A cable pair shifting system for shifting a cable pair from an old cable pair location to a new cable pair location on a main distribution frame, said system comprising:
   a plurality of quick shift jack panels installed on the main distribution frame at regular intervals, each quick shift jack panel comprising:

a first shift shoe comprising a first old pair of ports and a first new pair of ports;

a first test cord comprising a first old end for electrically coupling to said first old pair of ports and a second old end for electrically coupling to the old cable pair location;

a second test cord comprising a first new end for electrically coupling to said first new pair of ports and a second old end for electrically coupling to the new cable pair location; and connecting cables electrically coupling at least two of said plurality of quick shift jack panels;

said at least two coupled quick shift jack panels in combination with said first test cord, said second test cord, and said connecting cables shifting the cable pair from the old cable pair location to the new cable pair location.

16. A system as in claim 15 further comprising oscillator connections on at least one of said plurality of quick shift jack panels.

17. A system as in claim 15 further comprising auxiliary connections on at least one of said plurality of quick shift jack panels.

18. A system as in claim 15 further comprising external connections on at least one of said plurality of quick shift jack panels.

19. A method of shifting a cable pair from an old cable pair location to a new cable pair location on a communication system having a quick shift jack panel, said method comprising:

electrically coupling a first end of an old test cord to the old cable pair location;

electrically coupling a second end of said old test cord to a pair of old connections on said quick shift jack panel;

electrically coupling a first end of a new test cord to the new cable pair location; and electrically coupling a second end of said new test cord to a pair of new connections on said quick shift jack panel.

20. A method as in claim 19 wherein coupling a second end of said new test cord to a pair of new connections comprises coupling a second end of said new test cord to a pair of new connections on a second quick shift jack panel.

21. A method as in claim 19 wherein electrically coupling comprises plugging a jack into a port.

22. A method as in claim 19 wherein electrically coupling an end of a test cord is performed by at least one of plugging, press fitting, snapping, wrapping, twisting, and clipping.

* * * * *